(12) United States Patent
Oh et al.

(10) Patent No.: US 9,373,444 B2
(45) Date of Patent: Jun. 21, 2016

(54) POWER ELECTRONIC CAPACITOR MODULE FOR VEHICLE

(71) Applicant: SAMHWA CAPACITOR CO., LTD., Yongin-si (KR)

(72) Inventors: Young Joo Oh, Seoul (KR); Jung Rag Yoon, Yongin-si (KR); Kyung Min Lee, Paju-si (KR); Young Min Yoo, Suwon-si (KR)

(73) Assignee: SAMHWA CAPACITOR CO., LTD. (KR)

( * ) Notice: Subject to any disclaimer, the term of this patent is extended or adjusted under 35 U.S.C. 154(b) by 499 days.

(21) Appl. No.: 13/966,474

(22) Filed: Aug. 14, 2013

(65) Prior Publication Data

US 2014/0376157 A1    Dec. 25, 2014

(30) Foreign Application Priority Data

Jun. 25, 2013  (KR) .................. 10-2013-0073238

(51) Int. Cl.
*H01G 4/228* (2006.01)
*H01G 4/38* (2006.01)
*H01G 2/04* (2006.01)
*H02M 7/00* (2006.01)

(52) U.S. Cl.
CPC ............... *H01G 2/04* (2013.01); *H02M 7/003* (2013.01); *Y02T 10/7022* (2013.01)

(58) Field of Classification Search
USPC ................. 361/306.1, 306.3, 308.1; 174/68.2
See application file for complete search history.

(56) References Cited

U.S. PATENT DOCUMENTS

| 4,599,486 A | * | 7/1986 | Herrandez | H02G 5/005 174/72 B |
| 5,940,263 A | * | 8/1999 | Jakoubovitch | H01G 2/08 361/328 |
| 7,345,868 B2 | | 3/2008 | Trinh | |
| 8,686,288 B2 | * | 4/2014 | Kalayjian | H05K 7/1432 174/149 B |
| 9,241,413 B2 | * | 1/2016 | Guerin | H02M 7/003 |
| 2009/0229849 A1 | * | 9/2009 | Yang | H02G 5/005 174/68.2 |
| 2011/0308834 A1 | * | 12/2011 | Takahashi | H02M 7/003 174/68.2 |

FOREIGN PATENT DOCUMENTS

JP    2011101042 A  *  5/2011
KR    1020090050118     5/2009

* cited by examiner

*Primary Examiner* — Eric Thomas
(74) *Attorney, Agent, or Firm* — Cantor Colburn LLP

(57) ABSTRACT

A power electronic capacitor module for vehicle that may reduce the number of solderings by inserting and thereby mounting a capacitor between a single pair of bus bars and thereby may simplify an assembly process. The power electronic capacitor module for vehicle may include a single pair of bus bars disposed to be separate from each other and each having an external electrode support member; an insulating support frame formed to expose the external electrode support member and wrap around a single pair of bus bars and thereby support the bus bars; and a capacitor element having a single pair of external electrodes and inserted between a single pair of bus bars to thereby be supported by the bus bars or the external electrode support members and electrically connect the external electrodes to the external electrode support members.

20 Claims, 8 Drawing Sheets

POWER ELECTRONIC CAPACITOR MODULE FOR VEHICLE

CROSS-REFERENCE TO RELATED APPLICATION

This application claims the benefit of Korean Patent Application No. 10-2013-0073238, filed on Jun. 25, 2013, in the Korean Intellectual Property Office, the disclosure of which is incorporated herein by reference.

BACKGROUND OF THE INVENTION

1. Field of the Invention

The present invention relates to a power electronic capacitor module for vehicle, and more particularly, to a power electronic capacitor module for vehicle that may reduce the number of solderings by inserting and thereby mounting a capacitor between a single pair of bus bars and thereby, may simplify an assembly process.

2. Description of the Related Art

An electric vehicle uses a motor as a driving source and is classified into a hybrid and a battery vehicle based on a driving scheme of the motor. A hybrid electric vehicle generates a driving power by selectively driving an electric motor and an engine using fossil fuel. A fuel battery vehicle generates a driving power by converting chemical energy, such as hydrogen, to electricity and thereby driving an electric motor.

An electric vehicle stores, in a battery, the power for driving an electric motor, and includes an inverter to drive the electric motor by converting the stored power from direct current (DC) to alternating current (AC). The inverter may include a DC-link capacitor to absorb high frequency ripple current by smoothing or switching. A capacitor may generate a heat due to the high frequency ripple current. Due to the heat generation, a lifespan of the capacitor may be reduced, thereby degrading the overall performance of the inverter.

As the prior art to reduce the heat generation of a capacitor, which causes a degradation in performance of an inverter, Korean Registered Patent No. 925952 (Patent Document 1 registered on Nov. 2, 2009) was published. Patent Document 1 discloses a vehicular power electronic film capacitor module of an inverter having an enhanced cooling performance in which a single film capacitor cell module is configured by connecting an anode bus bar and a cathode bus par at both ends of two film capacitors disposed up and down. When the film capacitor cell module is configured, a plurality of film capacitor cell modules may be received within a case and be electrically connected using a bus plate. Accordingly, a required capacity of the power electronic capacitor module to be used for the inverter may be configured.

As in Patent Document 1, the conventional electric vehicle, that is, the conventional capacitor module for vehicle increases the number of electrical connection portions, that is, the number of solderings for configuring a capacitor module by connecting two capacitors to a bus bar to thereby configure a single capacitor cell module and then electrically connecting a plurality of capacitor cell modules using a bus plate in a state in which the plurality of capacitor cell modules is received within a case.

As in the conventional capacitor module for vehicle, when the number of solderings increases, an assembly process of the capacitor module may become complex and thus, manufacturing cost may increase. When the number of solderings increases, equivalent serial resistance (ESR) increases and thus, high frequency ripple current occurs in a capacitor itself Due to the high frequency ripple current, the capacitor module generates the heat and thus, a heat-resisting property is degraded. Also, as in the conventional power electronic capacitor module for vehicle, in a case in which the number of solderings increases, when an impact is transferred to a vehicle, stability of an assembly may be degraded, such as damaging a soldering portion. When the soldering portion is damaged due to the impact, the capacity of the capacitor module may be degraded, thereby degrading the reliability of a product

SUMMARY OF THE INVENTION

The present invention provides a power electronic capacitor module for vehicle that may reduce the number of solderings by inserting and thereby mounting a capacitor between a single pair of bars and thereby, may simplify an assembly process.

The present invention also provides a power electronic capacitor module for vehicle that may reduce the number of solderings for connecting a bus bar and a capacitor, thereby enhancing an equivalent serial resistance (ESR) property and may remove high frequency ripple current occurring due to an increase in ESR, thereby enhancing a heat-resisting property.

The present invention also provides a power electronic capacitor module for vehicle that may achieve assembly stability by reducing a probability that a soldering portion is damaged due to a decrease in the number of solderings and an external impact.

The present invention also provides a power electronic capacitor module for vehicle that may prevent degradation in capacity of the power electronic capacitor module, thereby enhancing the reliability of a product, when a soldering portion is damaged due to an impact.

The present invention also provides a power electronic capacitor module for vehicle that may reduce manufacturing cost by reducing the number of solderings for connecting a bus bar and a capacitor.

A power electronic capacitor module for vehicle according to a first embodiment of the present invention includes a single pair of bus bars disposed to be separate from each other and each having an external electrode support member; an insulating support frame formed to expose the external electrode support member and wrap around a single pair of bus bars and thereby support the bus bars; and a capacitor element having a single pair of external electrodes and inserted between a single pair of bus bars to thereby be supported by the bus bars or the external electrode support members and electrically connect the external electrodes to the external electrode support members.

A power electronic capacitor module for vehicle according to a second embodiment of the present invention includes a plurality of bus bars separate from each other to be mutually horizontal, and each having a plurality of external electrode support members arranged thereon; an insulating support frame formed to expose the plurality of external electrode support members and wrap around the plurality of bus bars and thereby support the bus bars; a plurality of capacitor elements, each having a single pair of external electrodes, and inserted between the plurality of bus bars to thereby be supported by the external electrode support members and be electrically connected to the external electrode support members; and a molding member formed within the insulating support frame to seal the plurality of capacitor elements. The insulating support frame is formed using an insert injection method, and the plurality of external electrode support members is spaced apart from the plurality of bus bars in a lengthwise direction of each bus bar, respectively, and thereby two-dimensionally arranged.

A power electronic capacitor module for vehicle according to a third embodiment of the present invention includes a plurality of bus bars separate from each other to be mutually horizontal, and each having a plurality of external electrode embers arranged thereon; an insulating support frame formed to expose the plurality of external support members and wrap around the plurality of bus bars and thereby support the bus bars; a plurality of capacitor elements, each having a single pair of external electrodes, and inserted between the plurality of bus bars to thereby be supported by the external electrode support members and be electrically connected to the external electrode support members; and a molding member formed within the insulating support frame to seal the plurality of capacitor elements. The insulating support frame is formed using an insert molding method, and the plurality of external electrode support members is spaced apart from the plurality of bus bars in a lengthwise direction of each bus bar and a widthwise direction orthogonal to the lengthwise direction of each bus bar, respectively, and thereby is three-dimensionally disposed.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
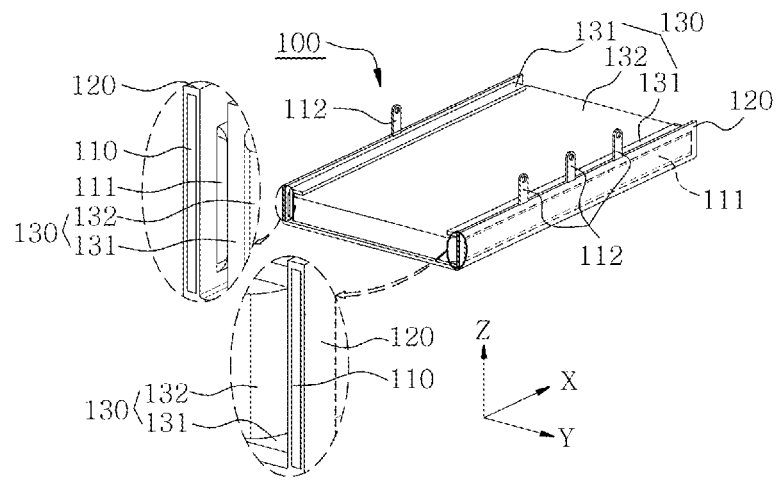
FIG. 1 is an assembly perspective view of a power electronic capacitor module for vehicle according to a first embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a power electronic capacitor module for vehicle according to embodiments of the present invention will be described with reference to the accompanying drawings.

Figure 2:
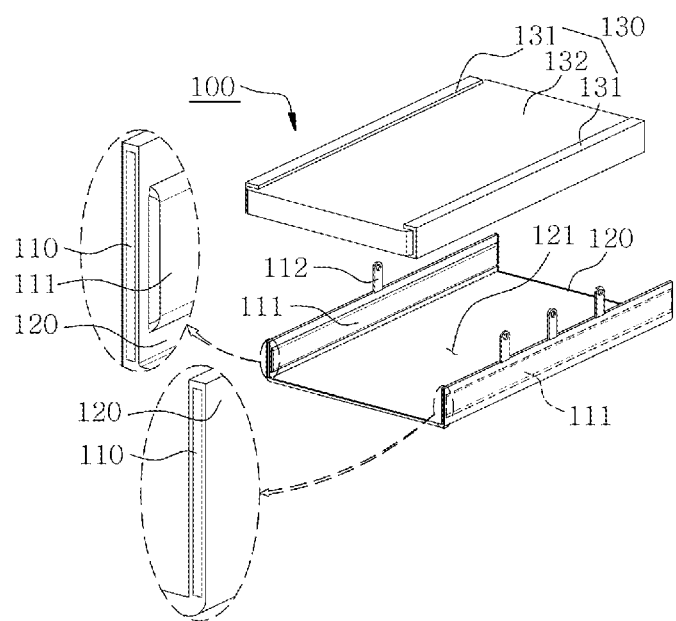
FIG. 2 is an exploded perspective view of the power electronic capacitor module of FIG. 1.

Referring to FIGS. 1 and 2, a power electronic capacitor module 100 for vehicle according to a first embodiment of the present invention includes a single pair of bus bars 110, an insulating support frame 120, and a capacitor element 130.

A single pair of bus bars 110 is disposed to be separate from each other and each bus bar 110 has an external electrode support member 111. The insulating support frame 120 is formed to expose the external electrode support member 111 and to wrap around a single pair of bus bars 110, thereby supporting a single pair of bus bars 110 to enable the bus bars 110 to support the capacitor element 130. The capacitor element 130 has a single pair of external electrodes 131 and is inserted between a single pair of bus bars 110 to thereby be supported by the bus bars 110 or the external electrode support members 111 and to electrically connect the external electrodes 131 to the external electrode support members 111.

Hereinafter, a configuration of the power electronic capacitor module 100 according to the first exemplary embodiment of the present invention constructed as above will be further described.

Figure 3:
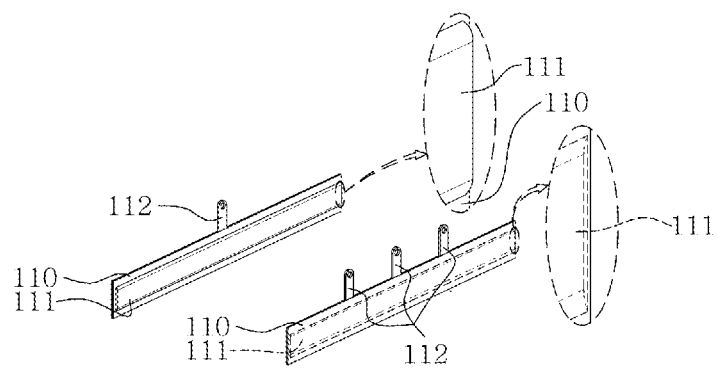
FIG. 3 is an enlarged perspective view of a single pair of bus bars of FIG. 1.

Referring to FIGS. 2 and 3, a single pair of bus bars 110 is disposed to stand on one side and another side of the insulating support frame 120, respectively. At least one terminal plate 112 for inputting and outputting an electrical signal is integrally formed at each end thereof. The external electrode support members 111 are formed on surfaces of one side and another side to pressurize a single pair of external terminals 131 formed at ends of one side and another side of the capacitor element 130, respectively, and thereby electrically connect the external terminals 131 to the bus bars 110. A material of the bus bars 110 uses a metal. For example, at least one of aluminum, bronze, and copper is selected and used.

The external electrode support member 111 configured to electrically connect the external terminals 131 of the capacitor element 130 and the bus bars 110 by pressurizing a single pair of external terminals 131 selects and thereby uses one or at least one of an embossing support member 111a, a curved support member 111b, and a truncated support member 111c. That is, among the embossing support member 111a, the curved support member 111b, and the truncated support member 111c, the identical configuration may be selected as a single pair or the embossing support member 111a may be disposed on one side and the curved support member 111b may be disposed on the other side, thereby increasing an elastic force for closely attaching and supporting the capacitor element 130. Hereinafter, each configuration will be described.

Figure 4:
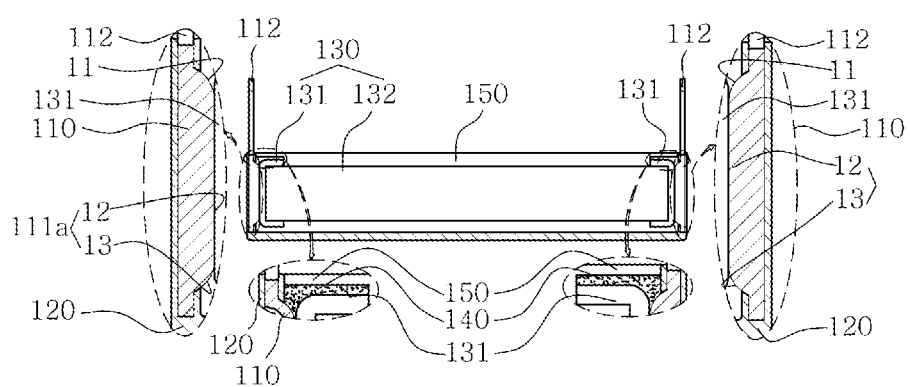
FIG. 4 is a cross-sectional view of the power electronic capacitor module of FIG. 1.
Figure 5:
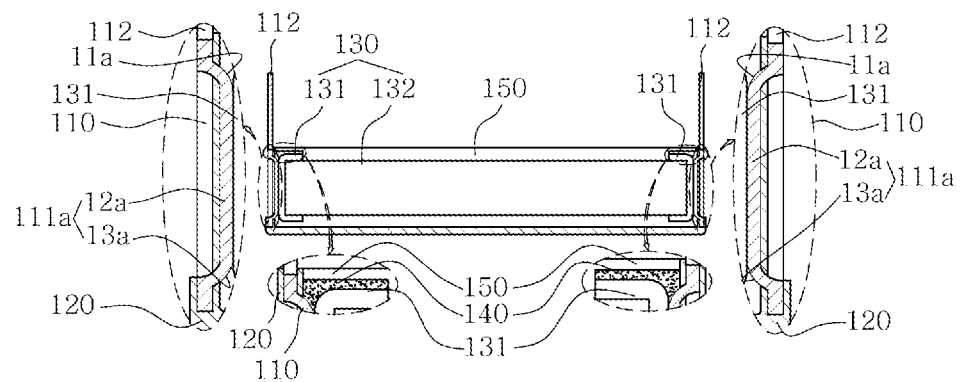
FIG. 5 is a cross-sectional view illustrating another embodiment of the bus bar of FIG. 4.

The embossing support member 111a may be integrally formed with the bus bar 110 as illustrated in FIG. 4, or may be protruded from a surface from one side or another side of the bus bar 110 using an embossing method among press molding presses as illustrated in FIG. 5. For example, the embossing support member 111a of FIG. 4 may increase a surface area according to an increase in volume and thus, may easily discharge a heat to an outside. The embossing support member 111a of FIG. 5 may be easily manufactured using the press embossing method, and may not form the insulating support frame 120 on the opposite surface of the embossing support member 111a, thereby enhancing a heat discharge property and a heat-resisting property. The embossing support member 111a is connected to the external electrode 131 of the capacitor element 130 in a state of not being separate from the bus bar 110 to thereby support the capacitor element 130, and includes a first curved guide portion 11, a protruding portion 12, and a second curved guide portion 13.

The first curved guide portion 11 inserts the capacitor element 130 between a single pair of bus bars 110 to thereby enable the capacitor element 130 to be further smoothly guided and inserted between the embossing support members 111a. The protruding portion 12 is connected to an end of one side of the first curved guide portion 11 to thereby closely contact with the external electrode 131 of the capacitor element 130 and be electrically connected thereto. The second curved guide portion 13 is connected to an end of one side of the protruding portion 12 to thereby provide an elastic force together with the first curved guide portion 11 so that the protruding portion 12 may be protruded toward the external electrode 131 of the capacitor element 130. Here, the elastic force indicates a force for unbending each of the first curved guide portion 11 and the second curved guide portion 13 being bent. That is, the elastic force indicates a force for restoration.

Figure 6:
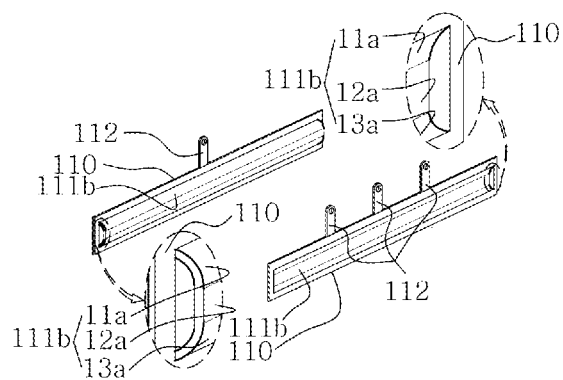
FIGS. 6 and 7, each, is a perspective view illustrating another embodiment of an external electrode support member of FIG. 4.

As illustrated in FIG. 6, in a state in which ends of one side and another side of a widthwise direction (Z of FIG. 1) orthogonal to a lengthwise direction (X of FIG. 1) of the bus bar 110 are connected to the bus bar 110, the curved support member 111b is formed to be protruded from a surface of one side or another side of the bus bar 110 to support the capacitor element 130. That is, ends of one side and the other side of the lengthwise direction (X of FIG. 1) orthogonal to the widthwise direction Z of the bus bar 110 are separate from the bus bar 110 and thereby protruded, and the curved support member 111b includes a first curved guide portion 11a, a protruding portion 12a, and a second curved guide portion 13a.

The first curved guide portion 11a is formed so that an end of one side of a first direction Z is connected to the bus bar 110 and ends of one side and the other side of a second direction X are separate from the bus bar 110, and guides the capacitor element 130 in the case of insertion in order to mount the capacitor element 130 between a single pair of bus bars 110. The protruding portion 12a is connected to an end of the other side of the first curved guide portion 11a, and the second curved guide portion 13a is formed to separate ends of one side and the other side of the lengthwise direction X of the bus bar 110 from the bus bar 110. As described above, the second curved guide portion 13a is formed and thus, when the capacitor element 130 is inserted, the second curved guide portion 13a is provided with a force for unbending, that is, an elastic force for restoring the first curved guide portion 11a together with the second curved guide portion 13a connected to an end of the other side of the protruding portion 12a formed to separate ends of one side and the other side of the lengthwise direction X of the bus bar 110 from the bus bar 110. Accordingly, it is possible to pressurize and thereby firmly mount the capacitor element 130.

Figure 7:
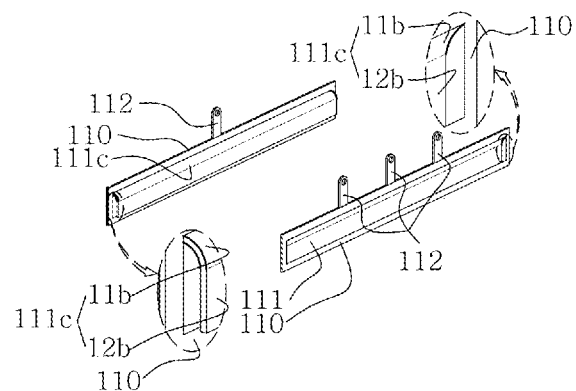

As illustrated in FIG. 7, in a state in which ends of one side and the other side are connected to the bus bar 110, the truncated support member 111c is protruded from the surface of one side and the other side of the bus bar 110 to thereby be connected to the external electrode 131 of the capacitor element 130 and support the capacitor element 130. That is, the truncated support member 111c is formed so that any one end of one side and the other side of the widthwise direction (Z of FIG. 1) of the bus bar 110 and ends of one side and the other side of the lengthwise direction (X of FIG. 1) of the bus bar 110 are separate from the bus bar 110, and includes a curved guide portion 11b and a protruding portion 12b.

The curved guide portion 11b is formed so that an end of one side of the first direction (Z) is connected to the bus bar 110 and ends of one side and the other side of the lengthwise direction X of the bus bar 110 are separate from the bus bar 110, and guides the capacitor element 130 to be inserted between a single pair of bus bars 110. The protruding portion 12b is formed so that an end of one side of the first direction Z is connected to the curved guide portion 11b and an end of the other side of the widthwise direction Z of the bus bar 110 is separate from the bus bar 110, and is provided with a force for unbending the curved guide portion 11b being bent, that is, an elastic force for restoring the curved guide portion 11b to thereby firmly support the capacitor element 130 and be electrically connected to the external electrode 131.

Figure 8:
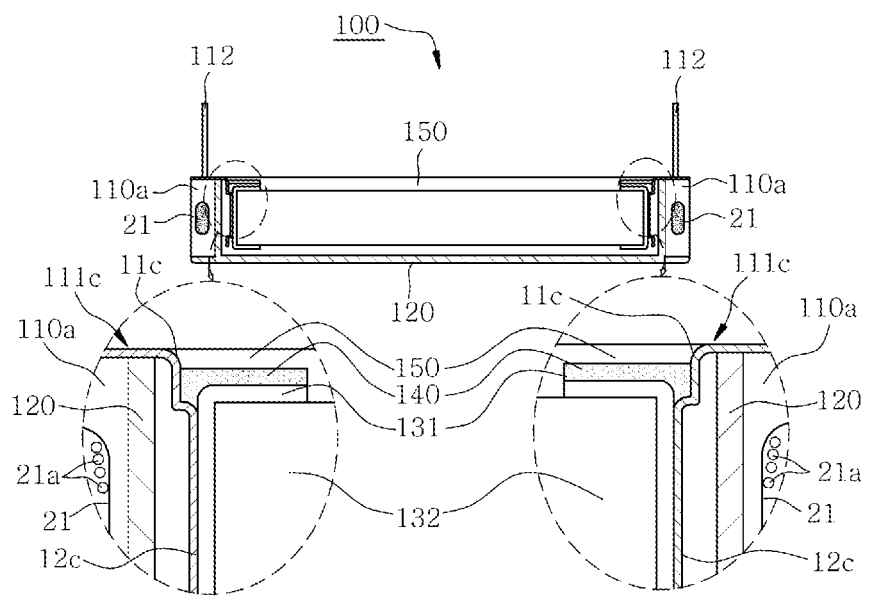
FIGS. 8 and 9, each, is a cross-sectional view illustrating another embodiment of a single pair of bus bars of FIG. 4.
Figure 9:
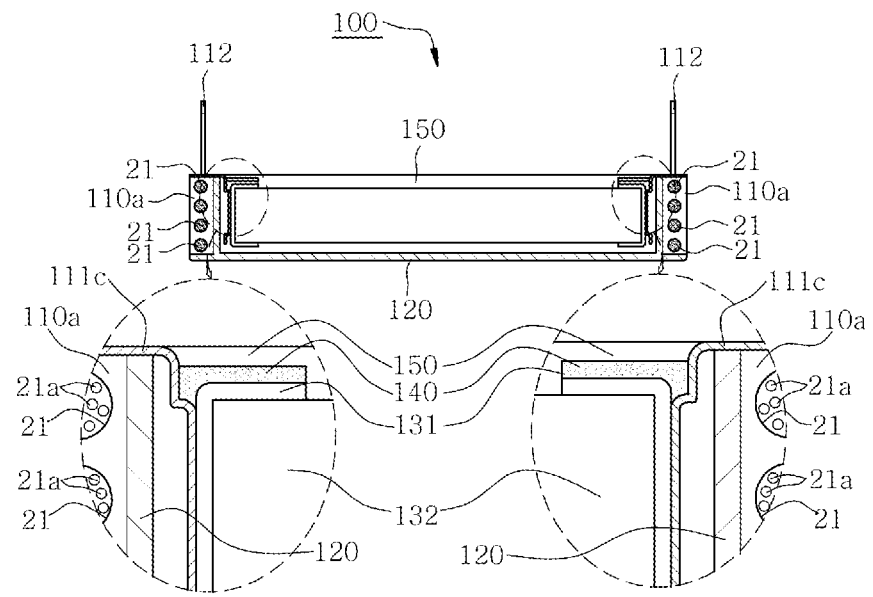

Other embodiments of a single pair of bus bars 110 each formed with the external electrode support member 111 are illustrated in FIGS. 8 and 9.

Referring to FIGS. 8 and 9, a single pair of bus bars 110 uses heat sink pipes 110a. The truncated support member 111b including the first curved guide portion 11c and the protruding portion 12c is connected to an end of one side of the heat sink pip 110a, and at least one hole 21 filled with metal powders 21a is formed in the lengthwise direction X of FIG. 1. For example, as illustrated in FIG. 8, the heat sink pipe 110a enables the heat generated from the capacitor element 130 to be easily discharged to an outside through the heat sink pipe 110a by forming a single hole 21 and filling the metal powders 21a within the hole 21. To further enhance heat discharge, the heat sink pipe 110a enables the heat generated from the capacitor element 130 to be easily discharged to the outside through the heat sink pipe 110a by forming four holes 21a and filling the metal powders 21a within each hole 21a as illustrated in FIG. 9.

As illustrated in FIGS. 2 and 4, the insulating support frame 120 is formed using an injection method, and the injection method uses an insert injection method or a transfer molding method. When forming the insulating support frame 120 using the injection method, a receiving space 121 for receiving the capacitor element 130 is formed between a single pair of bus bars 110. As illustrated in FIGS. 4, 5, and 8, the insulating support frame 120 is formed to wrap around at least one of one side surface and another side surface of the bus bar 110.

As illustrated in FIG. 4, the insulating support frame 120 injects the bus bar 110 to wrap around one surface and the other surface of the bus bar 110, that is, one side and the other side of a thickness direction (Y of FIG. 1) orthogonal to the lengthwise direction (X of FIG. 1) of the bus bar 110, excluding the embossing support member 111a used as the external terminal support member 111 from the bus bar 110. In the case of injection, a depressed portion (reference numeral not assigned) that is an opposite surface of the protruding portion 12 of the embossing support member 111a in the bus bar 110 is externally exposed so that the heat transferred to the bus bar 110 may be easily discharged to an outside.

As illustrated in FIG. 5, the insulating support frame 120 is formed to wrap around only one side or the other side of the bus bar 110, thereby enabling the heat transferred from the capacitor element 130 to the bus bar 110 to be easily discharged to an outside. As illustrated in FIGS. 8 and 9, when the heat sink pipe 110a is used for the bus bar 110, it is possible to prevent a heat discharge property from being degraded due to the insulating support frame 120 by forming the insulating support frame 120 through injecting the front of the heat sink pipe 110a.

A material of the insulating support frame 120 configured to support a single pair of bus bars 110 for discharging the heat or supporting the capacitor element 130 uses a plastic material to absorb an external impact. As described above, by selecting and using a material capable of absorbing the impact, it is possible to prevent the capacitor element 130 inserted between the external terminal support members 111 from being alienated and thereby being electrically open due to the impact transferred to a vehicle (not shown). One of polyamide (PA66), polyethylene terephthalate (PET), polycarbonate (PC), modified polyphenylene oxide (mPPO), polyphenylene sulfide (PPS), polyether ether ketone (PEEK), liquid crystal polymer (LCP), and polyoxymethylene (POM) is selected and thereby used for the material of the insulating support frame 120 capable of absorbing the external impact.

As illustrated in FIG. 2, due to the elastic force provided to the external electrode support member 111, the capacitor element 130 contacts with the external electrode support member 111 to thereby be electrically connected thereto or connected to the external electrode support member 111 and soldering. A multilayer ceramic capacitor (MLCC) or a surface mount device (SMD) type film capacitor including a single pair of external electrodes 131 is used to be connected to one side and the other side of a capacitor body 132. A single pair of the external electrodes 131 is formed on ends of one side and the other side of the capacitor body 132, respectively, and provides a soldering surface in the case of adding a soldering portion 140, thereby enabling the soldering portion 140 to further firmly maintain bonding between the external electrode 131 and the external electrode support member 111. The capacitor body 132 corresponds to an active area of the capacitor element 130 and a size of the capacitor body 132 is used to determine capacitance of the capacitor element 130.

As illustrated in FIGS. 4 and 5, the power electronic capacitor module 100 includes the soldering portion 140 and a molding member 150.

In a state in which the capacitor element 130 is electrically connected to the external electrode support member 111 by the elastic force provided from the capacitor element 130 to the external electrode support member 111, the soldering portion 140 connects the external electrode 131 of the capacitor element 130 to the external electrode support member 111 using a soldering method, thereby enabling the capacitor element 130 to be further firmly connected to the external electrode support member 111. That is, the capacitor element 130 is supported by the elastic force provided to the external electrode support member 111 or connected to the external electrode support member 111 and the soldering portion 140. The soldering portion 140 is formed using a solder cream. A material of the solder cream includes one of or a mixture of at least two of lead (Pb), tin (Sn), silver (Ag), and copper (Cu).

The molding member 150 prevents the power electronic capacitor module 100 from being contaminated due to an external humidity or foreign substance, or is formed on the capacitor element 130 to be further firmly connected to the external electrode support member 111, thereby sealing the capacitor element 130. The molding member 150 is formed within the insulating support frame 120. A material of the molding member 150 uses epoxy molding compound (EMC) or silicone (Si).

Figure 11:
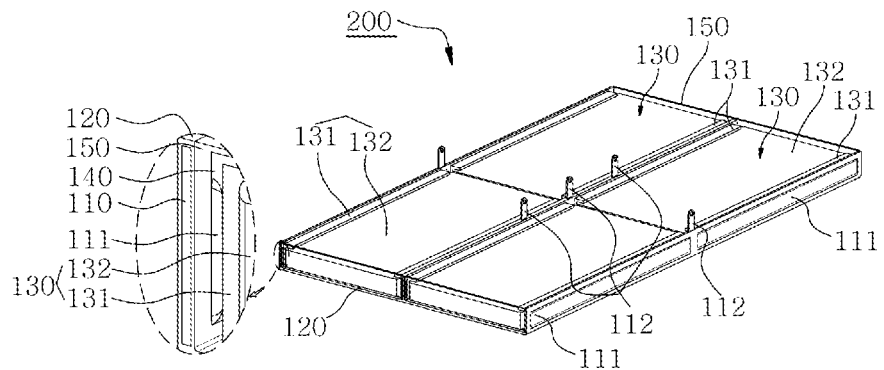
FIG. 11 is an assembly perspective view of a power electronic capacitor module for vehicle according to a second embodiment of the present invention.
Figure 12:
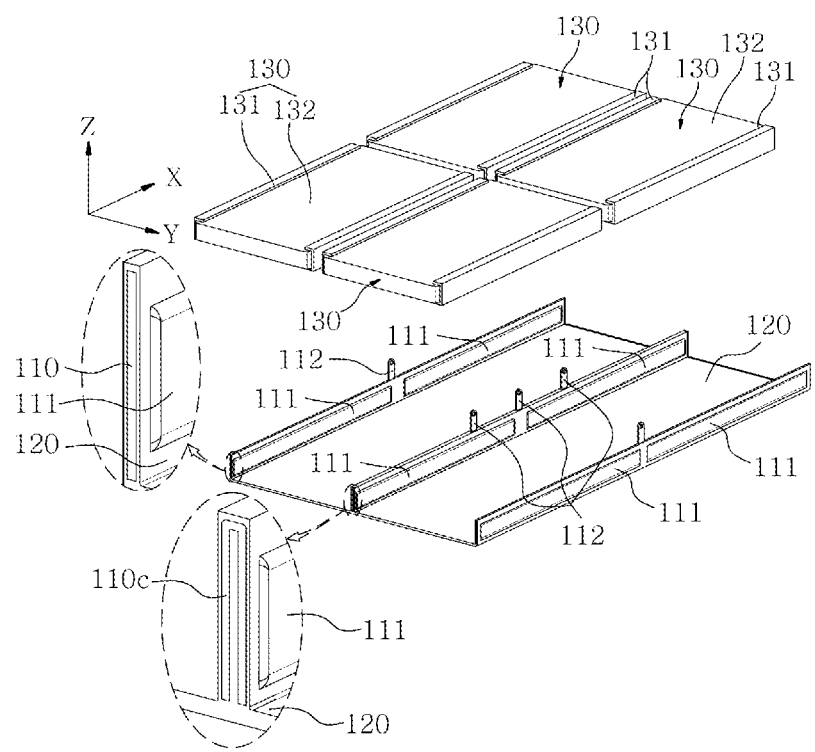
FIG. 12 is an exploded assembly perspective view of the power electronic capacitor module of FIG. 11.

Another embodiment of the power electronic capacitor module 100 of the present invention constructed as above is illustrated in FIGS. 11 and 12.

Referring to FIGS. 11 and 12, a power electronic capacitor module 200 for vehicle according to another embodiment of the present invention includes a plurality of bus bars 110, an insulating support frame 120, a plurality of capacitor elements 130, and a molding member 150.

The plurality of bus bars 110 is separate from each other to be mutually horizontal, and each includes a plurality of external electrode support members 111. That is, the plurality of external electrode support members 111 is formed on each bus bar 110 to be two-dimensionally arranged in a lengthwise direction X of each bus bar 110. The insulating support frame 120 is formed to expose the plurality of external electrode support members 111 two-dimensionally arranged and to wrap around the plurality of bus bars 110, thereby supporting the bus bars 110, and is formed using an insert injection method. Each of the plurality of capacitor elements 130 has a single pair of external electrodes 131 and is inserted between the plurality of bus bars 110 to be supported by the external electrode support member 111 and be electrically connected thereto. The molding member 150 is formed within the insulating support frame 120 to seal the plurality of capacitor elements 130.

Figure 13:
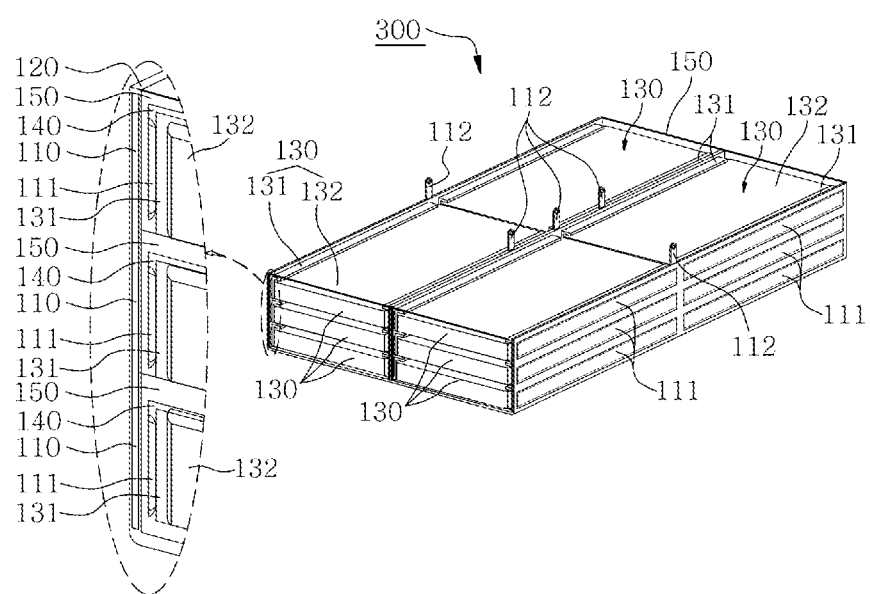
FIG. 13 is an assembly perspective view of a power electronic capacitor module for vehicle according to a third embodiment of the present invention.
Figure 14:
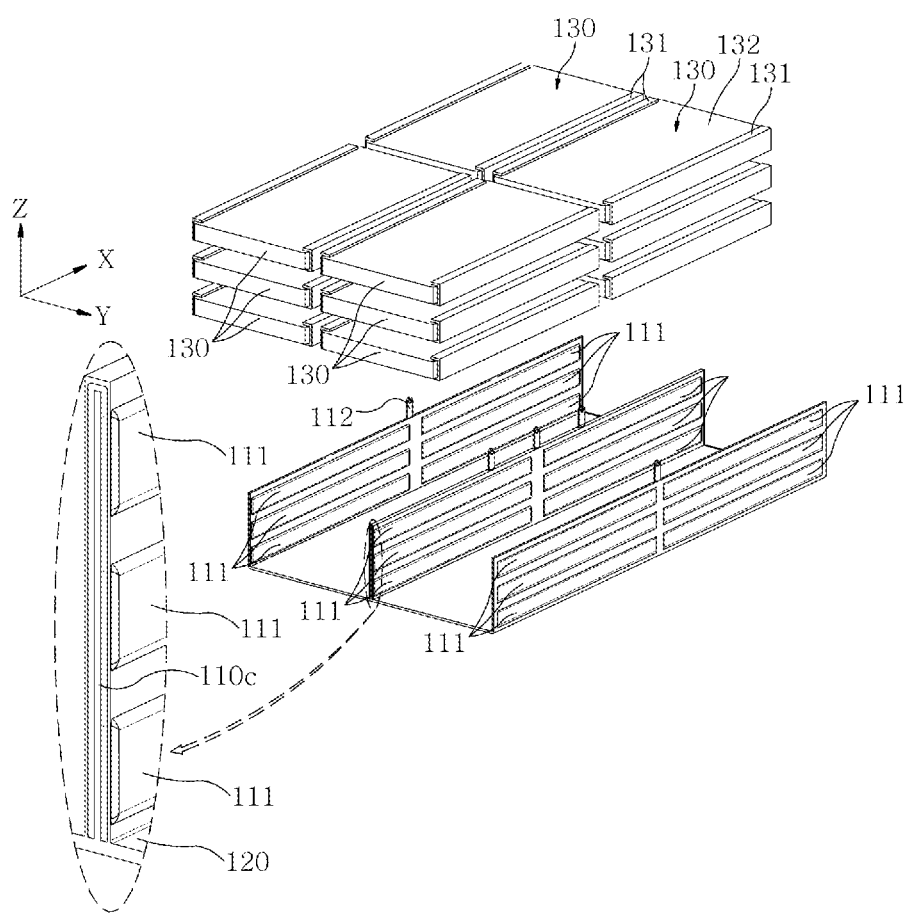
FIG. 14 is an exploded assembly perspective view of the power electronic capacitor module of FIG. 13.

Still another embodiment of the power electronic capacitor module 200 is illustrated in FIGS. 13 and 14. The power electronic capacitor module 200 according to still another embodiment of the present invention includes a plurality of bus bars 110, an insulating support frame 120, a plurality of capacitor elements 130, and a molding member 150.

The plurality of bus bars 110 is separate from each other to be mutually horizontal, and each includes a plurality of external electrode support members 111. That is, each of the plurality of bus bars 110 is formed so that the plurality of external electrode support members 111 is spaced apart from each bus bar 110 in a lengthwise direction X and a widthwise direction Z of each bus bar 110 and thereby three-dimensionally arranged. The insulating support frame 120 is formed to expose the plurality of external electrode support members 111 three-dimensionally arranged and to wrap around the plurality of bus bars 110, thereby supporting the bus bars 110, and is formed using an insert injection method. Each of the plurality of capacitor elements 130 has a single pair of external electrodes 131 and is inserted between the plurality of bus bars 110 to be supported by the external electrode support member 111 and be electrically connected thereto. The molding member 150 is formed within the insulating support frame 120 to seal the plurality of capacitor elements 130.

In each of the power electronic capacitor modules 200 and 300 according to other embodiments of the present invention illustrated in FIGS. 11 through 14, at least one of the plurality of bus bars 110 is provided in a shape of '∩', and the plurality of external electrode support members 111 is formed on each of one side surface and another side surface of each bus bar 110. In a state in which the capacitor element 130 is electrically connected to the external electrode support member 111 by an elastic force provided to the external electrode support member 111, the capacitor element 130 supported by the external electrode support member 111 formed on the bus bar 110 is connected to the soldering portion 140 formed through soldering and thus, further firmly connected to the external electrode support member 111.

Hereinafter, an assembly method of the power electronic capacitor modules 100, 200, and 300 of the present invention will be described.

In each embodiment of the power electronic capacitor modules 100, 200, and 300, the external electrode support members 111 are formed on a single pair of bus bars 110 to face each other and the insulating support frame 120 is formed to wrap around a single pair of bus bars 110 using an insert injection method. When forming the insulating support frame 120, the receiving space 121 is formed within the insulating support frame 120 and the capacitor element 130 is received within the receiving space 121.

In the case of receiving the capacitor element 130 within the receiving space 121, when the embossing support member 111a is used as the external terminal support member 111, the power electronic capacitor module 100 arranges the capacitor element 130 on the first curved guide portion 11. When the capacitor element 130 is disposed on the first curved guide portion 11, the capacitor element 130 is moved to the protruding portion 12 by applying a force toward a downward direction in a widthwise direction of the bus bar 110. When the capacitor element 130 is moved to the protruding portion 12 and then inserted therein, the capacitor element 130 is supported by and mounted to the protruding portion 12 due to the elastic force of the first curved guide portion 11 and the second curved guide portion 13. To further firmly maintain a mounting state, the soldering portion 140 is formed in a state in which the capacitor element 130 is inserted into the protruding portion 12.

The power electronic capacitor module 200 uses the plurality of bus bars 110. The external electrode support members 111 are arranged on each bus bar 110 in the lengthwise direction of each bus bar 110 and thus, are overall two-dimensionally arranged. Accordingly, the soldering portion 140 is formed by inserting the capacitor element 130 between the respective external electrode support members 111 and thereby mounting the capacitor element 130.

The power electronic capacitor module 300 uses the plurality of bus bars 110. The external electrode support members 111 are arranged on each bus bar 110 in the lengthwise direction X and the widthwise direction Z of each bus bar 110 and thus, are overall three-dimensionally arranged. Accordingly, the soldering portion 140 is formed by inserting the capacitor element 130 between the external electrode support members 111 adjacent to a bottom surface of the insulating support frame 120 among the external electrode support members 111 and thereby mounting the capacitor element 130. When the soldering portion 140 is formed, the above sequence is repeated after forming the molding member 150 and then inserting the capacitor element 130 between the external electrode support members 111. Accordingly, the capacitor elements 130 are three-dimensionally arranged and thereby mounted to the bus bars 110.

Figure 10:
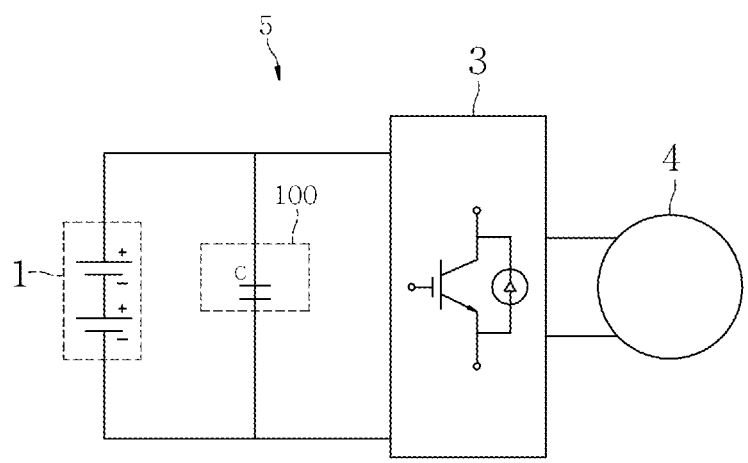
FIG. 10 is a circuit diagram illustrating a configuration of an inverter applied with the power electronic capacitor module of the present invention.

As described above, at least one capacitor element 130 is mounted to the power electronic capacitor modules 100, 200, and 300 of the present invention. As illustrated in FIGS. 7, 11, and 13, at least one terminal plate 112 provided to each of a single pair of bus bars 110 is connected to an inverter 3 of FIG. 10. A circuit of FIG. 10 is a power transfer device of a vehicle using electricity as a power and includes a battery 1, the power electronic capacitor module 100, the inverter 3, and a driving source 4.

The battery 1 is used as a power source and the driving source 4 is used for a motor or a power generation. The inverter 3 is used to control a torque and a driving speed of the driving source 4. The inverter 3 is used as a motor or a power generator by converting a DC power output from the battery 1 to an AC power and thereby applying the converted AC power to the driving source 4. The power electronic capacitor module 100 connects each of a single pair of bus bars 110 to the battery 1 and connects at least one terminal plate 112 to the inverter 3, thereby enabling the DC power supplied from the battery 1 to be stably supplied to the inverter 3.

As described above, a power electronic capacitor module for vehicle according to the present invention may reduce the number of solderings by inserting and thereby mounting a capacitor between a single pair of bars and thereby, may simplify an assembly process. Also, the power electronic capacitor module may reduce the number of solderings for connecting a bus bar and a capacitor, thereby enhancing an equivalent serial resistance (ESR) property and may remove high frequency ripple current occurring due to an increase in ESR, thereby enhancing a heat-resisting property. Also, the power electronic capacitor module vehicle may achieve assembly stability by reducing a probability that a soldering portion is damaged due to a decrease in the number of solderings and an external impact. Also, the power electronic capacitor module may prevent degradation in capacity of the power electronic capacitor module, thereby enhancing the reliability of a product, when a soldering portion is damaged due to an impact. Also, the power electronic capacitor module may reduce manufacturing cost by reducing the number of solderings for connecting a bus bar and a capacitor.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A power electronic capacitor module for a vehicle, comprising:
    a pair of bus bars disposed to be separate from each other and each having an external electrode support member;
    an insulating support frame formed to expose the external electrode support members and wrap around the pair of bus bars and thereby support the bus bars; and
    a capacitor element having a pair of external electrodes and inserted between the pair of bus bars to thereby be supported by the bus bars or the external electrode support members and electrically connect the external electrodes to the external electrode support members.

2. The power electronic capacitor module of claim 1, wherein the pair of bus bars is disposed on one side and another side of the insulating support frame, respectively, and is integrally formed with at least one terminal board for inputting and outputting an electrical signal at the respective ends thereof.

3. The power electronic capacitor module of claim 1, wherein each of the pair of bus bars selects and uses at least one of an embossing support member, a curved support member, and a truncated support member.

4. The power electronic capacitor module of claim 3, wherein the embossing support member is protruded from a surface of one side or another side of the bus bar using an embossing method among press molding processes to thereby be connected to the external electrode of the capacitor element and support the capacitor element.

5. The power electronic capacitor module of claim 3, wherein the curved support member is protruded from a surface of one side or another side of the bus bar in a state in which ends of one side and another side are connected to the bus bar, to thereby be connected to the external electrode of the capacitor element and support the capacitor element.

6. The power electronic capacitor module of claim 3, wherein the truncated support member is protruded from a surface of one side or another side of the bus bar in a state in which ends of one side and another side are connected to the bus bar, to thereby be connected to the external electrode of the capacitor element and support the capacitor element.

7. The power electronic capacitor module of claim 1, wherein a heat sink pipe is used for each of the pair of bus bars, and the heat sink pipe connects a truncated support member to an end of one side and is formed with at least one hole to be filled with metal powders in a lengthwise direction.

8. The power electronic capacitor module of claim 1, wherein
the insulating support frame is formed using an injection method,
the injection method uses an insert injection method or a transfer molding method, and
when forming the insulating support frame using the injection method, a receiving space for receiving the capacitor element is formed between the pair of bus bars.

9. The power electronic capacitor module of claim 1, wherein the insulating support frame is formed to wrap around at least one of one side surface and another side surface of each of the pair of the bus bars, or is formed to wrap around an end of another side of each of the pair of the bus bars.

10. The power electronic capacitor module of claim 1, wherein the insulating support frame is formed from a material selected from the group consisting of polyamide 66 (PA66), polyethylene terephthalate (PET), polycarbonate (PC), modified polyphenylene oxide (mPPO), polyphenylene sulfide (PPS), polyether ether ketone (PEEK), liquid crystal polymer (LCP), and polyoxymethylene (POM).

11. The power electronic capacitor module of claim 1, wherein the capacitor element is a multi-layer ceramic capacitor (MLCC) or a surface mount device (SMD) type film capacitor.

12. The power electronic capacitor module of claim 1, wherein the capacitor element is electrically connected to the external electrode support members by an elastic force of the external electrode support members or by a soldering portion formed between the capacitor element and the external electrode support members.

13. The power electronic capacitor module of claim 1, wherein the capacitor element is sealed by a molding member formed on the capacitor element, and the molding member is formed within the insulating support frame to seal the capacitor element.

14. The power electronic capacitor module of claim 13, wherein a material of the molding member is an epoxy molding compound (EMC).

15. A power electronic capacitor module for a vehicle, comprising:
a plurality of bus bars separate from each other to be mutually horizontal, and each having a plurality of external electrode support members arranged thereon;
an insulating support frame formed to expose the plurality of external electrode support members and wrap around the plurality of bus bars and thereby support the bus bars;
a plurality of capacitor elements, each having a single pair of external electrodes, and inserted between the plurality of bus bars to thereby be supported by the external electrode support members and be electrically connected to the external electrode support members; and
a molding member formed within the insulating support frame to seal the plurality of capacitor elements,
wherein the insulating support frame is formed using an insert injection method, and the plurality of external electrode support members is spaced apart from the plurality of bus bars in a lengthwise direction of each bus bar, respectively, and thereby two-dimensionally arranged.

16. The power electronic capacitor module of claim 15, wherein at least one of the plurality of bus bars is formed in a shape of '∩', and the plurality of external electrode support members is formed on each of one side and another side thereof.

17. The power electronic capacitor module of claim 15, wherein the capacitor element is electrically connected to the external electrode support members by an elastic force of the external electrode support members or by a soldering portion formed between the capacitor element and the external electrode support members.

18. A power electronic capacitor module for a vehicle, comprising:
a plurality of bus bars separate from each other to be mutually horizontal, and each having a plurality of external electrode support members arranged thereon;
an insulating support frame formed to expose the plurality of external support members and wrap around the plurality of bus bars and thereby support the bus bars;
a plurality of capacitor elements, each having a single pair of external electrodes, and inserted between the plurality of bus bars to thereby be supported by the external electrode support members and be electrically connected to the external electrode support members; and
a molding member formed within the insulating support frame to seal the plurality of capacitor elements,
wherein the insulating support frame is formed using an insert molding method, and the plurality of external electrode support members is spaced apart from the plurality of bus bars in a lengthwise direction of each of the bus bars and a widthwise direction orthogonal to the lengthwise direction of each of the bus bars, respectively, and thereby is three-dimensionally disposed.

19. The power electronic capacitor module of claim 18, wherein at least one of the plurality of bus bars is formed in a shape of '∩', and the plurality of external electrode support members is formed on each of one side and another side thereof.

20. The power electronic capacitor module of claim 18, wherein each of the capacitor elements is electrically connected to the external electrode support members by an elastic force of the external electrode support members or by a soldering portion formed between each of the capacitor element and the external electrode support members.

* * * * *